(12) United States Patent
Nyholt et al.

(10) Patent No.: US 12,641,180 B2
(45) Date of Patent: *May 26, 2026

(54) METHODS AND SYSTEMS FOR VERIFICATION OF AN AFFILIATION OF A CALL INITIATOR WITH AN ORGANIZATION

(71) Applicant: Techjutsu Properties Inc., Calgary (CA)

(72) Inventors: Tracey Nyholt, Calgary (CA); Kevin Klitzke, Calgary (CA); Michael Bond, Calgary (CA)

(73) Assignee: Techjutsu Properties Inc., Calgary (CA)

( * ) Notice: Subject to any disclaimer, the term of this patent is extended or adjusted under 35 U.S.C. 154(b) by 417 days.

This patent is subject to a terminal disclaimer.

(21) Appl. No.: 18/395,375

(22) Filed: Dec. 22, 2023

(65) Prior Publication Data

US 2025/0211677 A1 Jun. 26, 2025

(51) Int. Cl.
| | |
|---|---|
| *H04M 3/436* | (2006.01) |
| *H04L 9/08* | (2006.01) |
| *H04L 9/32* | (2006.01) |

(52) U.S. Cl.
CPC .......... *H04M 3/436* (2013.01); *H04L 9/0869* (2013.01); *H04L 9/3228* (2013.01)

(58) Field of Classification Search
CPC ..... H04M 3/436; H04L 9/0869; H04L 9/3228
USPC ...................................................... 455/414.1
See application file for complete search history.

(56) References Cited

U.S. PATENT DOCUMENTS

| | | | |
|---|---|---|---|
| 8,300,791 | B2 | 10/2012 | O'Sullivan et al. |
| 9,060,057 | B1 | 6/2015 | Danis |
| 9,544,424 | B1 | 1/2017 | Cain et al. |
| 10,771,455 | B2 | 9/2020 | Quirke et al. |
| 10,958,774 | B1 * | 3/2021 | Harding .............. H04W 12/043 |
| 11,570,296 | B2 | 1/2023 | Sharma et al. |
| 11,595,515 | B2 | 2/2023 | van Rensburg et al. |
| 11,856,132 | B2 | 12/2023 | Jakobsson |

(Continued)

FOREIGN PATENT DOCUMENTS

| | | |
|---|---|---|
| CN | 108599944 A | 9/2018 |
| EP | 2650810 A1 | 10/2013 |
| JP | 2005277620 A | 10/2005 |

*Primary Examiner* — Joel Ajayi
(74) *Attorney, Agent, or Firm* — Todd A. Rattray; Oyen Wiggs Green & Mutala LLP

(57) ABSTRACT

A method for verifying, by a receiver during a call, an alleged affiliation of an initiator with an organization comprises: receiving an initiator request comprising one or more first identifiers; generating a verification secret in response to the initiator request; sending the verification secret to the initiator; storing the verification secret in a database; receiving a receiver request to verify an alleged verification secret, the receiver request comprising one or more second identifiers; if there is a match between the second identifier(s) and the first identifier(s), comparing the alleged verification secret to the verification secret; and sending to the receiver: a positive response if there is a match between the alleged verification secret and the verification secret; or a negative response if there is no match between the second identifier(s) and the first identifier(s) or there is no match between the alleged verification secret and the verification secret.

19 Claims, 12 Drawing Sheets

(56) References Cited

U.S. PATENT DOCUMENTS

| 11,902,464 | B1 | 2/2024 | Harrison |
|---|---|---|---|
| 12,126,765 | B1 | 10/2024 | Dziuk et al. |
| 2006/0188076 | A1 | 8/2006 | Isenberg |
| 2009/0116630 | A1 | 5/2009 | O'Sullivan et al. |
| 2013/0216029 | A1 | 8/2013 | Pawlewski |
| 2015/0172257 | A1 | 6/2015 | Truitt et al. |
| 2016/0323450 | A1* | 11/2016 | Disraeli .............. H04M 3/5183 |
| 2016/0352894 | A1 | 12/2016 | Mulay et al. |
| 2017/0104870 | A1 | 4/2017 | Mandanapu et al. |
| 2018/0032526 | A1 | 2/2018 | Cudak et al. |
| 2018/0211021 | A1 | 7/2018 | Negi et al. |
| 2021/0099573 | A1 | 4/2021 | van Rensburg et al. |
| 2021/0258421 | A1* | 8/2021 | Jakobsson .............. H04W 4/14 |
| 2022/0141326 | A1 | 5/2022 | Joshi et al. |
| 2022/0245747 | A1 | 8/2022 | Nyholt et al. |
| 2023/0308294 | A1 | 9/2023 | Aoshima |

* cited by examiner to Fig. 1B

434

| | | | _ ⬜ x |
| ← C ⌂ | ⬭⬭⬭⬭⬭⬭⬭⬭⬭⬭⬭⬭⬭⬭⬭⬭ | | |

OrgVerify - Organization                                    kevin.klitzke@techjutsu.com

| Name | Email | Status | OrgVerify |
|------|-------|--------|-----------|
| Mike Testing 1 | mike.bond+testing@techjutsu.com | ACTIVE | ✓ |
| Mike Testing | mike.bond@techjutsu.com | ACTIVE | ✓ |
| Mike PWReset | mike.bond+pwreset@techjutsu.com | PASSWORD_EXPIRED | ✓ |
| Mike Bond | mike.bond@techjutsu.com | ACTIVE | ✓ |

436

Your Cell Company     ıl 🛜 ▮▮▯

Org Verify              Login

Verification Secret

Enter the verification secret here

CLOSE     VERIFY

Canada Revenue Agency

436

436

METHODS AND SYSTEMS FOR VERIFICATION OF AN AFFILIATION OF A CALL INITIATOR WITH AN ORGANIZATION

TECHNICAL FIELD

This application is directed to methods and systems for verification of an alleged affiliation of a call initiator with an organization. More particularly, this application is directed to methods and systems for allowing a call receiver to verify an alleged affiliation of a call initiator with an organization during a call initiated by the call initiator.

BACKGROUND OF THE INVENTION

Call initiators (referred to herein as "initiators") such as, for example, representatives or employees of businesses, charities, government organizations and/or call center employees representing businesses, charities and/or government organizations have limited options to prove their affiliation with such businesses, charities and/or government organizations when making calls to call receivers (referred to herein as "receivers") such as consumers, citizens or other organizations.

For example, in some cases, initiators currently may rely on providing identifying details such as an organization phone number, address or agent ID to identify themselves as being validly affiliated with an organization. However, such identifying details may be obtained by bad actors (e.g., criminals, perpetrators of fraud, pranksters, etc.) and/or may be difficult to verify. As such, these identifying details may not provide a sufficient option for receivers to validate an alleged affiliation of an initiator with a particular business, charity or government organization.

As another example, receivers may rely on checking phone number from which a call appears to have originated against known phone numbers by, for example, employing a caller identification service (commonly referred to as "caller ID"). However, with the rise of falsification, or "spoofing" of phone numbers and caller IDs, receivers can no longer assume that a caller ID service is an accurate means of confirming an affiliation of an initiator with a particular business, charity or government organization.

As another example, receivers can choose to end a call from an initiator allegedly affiliated with a particular organization and then initiate a new call to a known phone number of that organization in order to ensure that they are speaking to an actual representative of the organization. However, this can place a significant burden on the receiver as they may need to wait on hold in order to speak to a representative of the organization when they call.

There is a general desire for methods and systems to efficiently and reliably allow receivers to verify the alleged affiliation of an initiator with a particular business, charity or government organization during a call.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method, performed on a computer, for verifying, by a receiver during a call, an alleged affiliation of an initiator with an organization. The method comprises: receiving an initiator request from the initiator via an initiator interface, the initiator request comprising one or more first identifiers; generating a verification secret in response to the initiator request; sending the verification secret to the initiator via the initiator interface; storing the verification secret in association with the one or more identifiers in a database; receiving a receiver request to verify an alleged verification secret from the receiver via a receiver interface, the receiver request comprising one or more second identifiers; comparing the one or more second identifiers to the one or more first identifiers stored in the database and, if there is a match between the one or more second identifiers and the one or more first identifiers, comparing the alleged verification secret to the verification secret; and sending to the receiver via the receiver interface: a positive response if there is a match between the alleged verification secret and the verification secret; or a negative response if there is no match between the one or more second identifiers and the one or more first identifiers or there is no match between the alleged verification secret and the verification secret.

The verification secret may comprise a randomly generated verification secret.

The verification secret may comprise an alphanumeric verification secret.

The verification secret may comprise one or more words and the alleged verification secret may comprise an image representing the one or more words.

The one or more first identifiers may comprise an initiator identifier and the one or more second identifiers may comprise an alleged initiator identifier.

The one or more first identifiers may comprise a receiver identifier and the one or more second identifiers may comprise an alleged receiver identifier.

The receiver identifier may comprise a phone number and the alleged receiver identifier may comprise a phone number.

The receiver interface may be displayed on a first device of the receiver and the receiver may receive the call via the first device of the receiver.

The receiver interface may be displayed on a first device of the receiver and the receiver may receive the call via a second device of the receiver.

The receiver interface may be accessible within a downloadable application of an organization allegedly affiliated with the initiator.

The receiver interface may be accessible via a website of an organization allegedly affiliated with the initiator.

The method may comprise deactivating the verification secret after sending the positive response.

The method may comprise deactivating the verification secret after a time limit expires.

The method may comprise authenticating an identity of the initiator before receiving the initiator request.

The method may comprise authenticating an identity of the receiver before receiving the receiver request.

Another aspect of the invention provides a system for verifying, by a receiver during a call, the affiliation of an initiator with an organization. The system comprises one or more processors configured to: receive an initiator request from the initiator via an initiator interface, the initiator request comprising one or more first identifiers; generate a verification secret in response to the initiator request; send the verification secret to the initiator via the initiator interface; store the verification secret in association with the one or more identifiers in a database; receive a receiver request to verify an alleged verification secret from the receiver via a receiver interface, the receiver request comprising one or more second identifiers; compare the one or more second identifiers to the one or more first identifiers stored in the database and, if there is a match between the one or more second identifiers and the one or more first identifiers, compare the alleged verification secret to the verification secret; and send to the receiver via the receiver interface: a positive response if there is a match between the alleged verification secret and the verification secret; or a negative response if there is no match between the one or more second identifiers and the one or more first identifiers or there is no match between the alleged verification secret and the verification secret.

The receiver interface may be displayed on a first device of the receiver and the receiver may receive the call via the first device of the receiver.

The receiver interface may be displayed on a first device of the receiver and the receiver may receive the call via a second device of the receiver.

The receiver interface may be accessible within a downloadable application of an organization allegedly affiliated with the initiator.

Another aspect of the invention provides a method, performed on a computer, of verifying, by a receiver during a call, the affiliation of an initiator with an organization. The method comprises: receiving an initiator request from the initiator via an initiator interface; generating a verification secret in response to the initiator request; sending the verification secret to the initiator via the initiator interface; storing the verification secret in a database; receiving a receiver request to verify an alleged verification secret from the receiver via a receiver interface; comparing the alleged verification secret to the verification secret; sending to the receiver via the receiver interface: a positive response if there is a match between the alleged verification secret and the verification secret; or a negative response if there is no match between the one or more second identifiers and the one or more first identifiers or there is no match between the alleged verification secret and the verification secret.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method for a receiver to verify an alleged affiliation of an initiator with an organization. The method may occur during a call initiated by the initiator. The method may start with receiving an initiator request from the initiator via an initiator interface displayed on a device of the initiator. The initiator request may comprise one or more first identifiers. A verification secret may then be generated in response to the initiator request. The verification secret may then be sent to the initiator via the initiator interface and the verification secret may be stored in a database in association with the one or more first identifiers. The method may also comprise receiving a receiver request to verify an alleged verification secret from the receiver via a receiver interface displayed on a device of the receiver. The receiver request may comprise one or more second identifiers. The one or more second identifiers may then be compared to the one or more first identifiers stored in the database and, if there is a match between the one or more second identifiers and the one or more first identifiers, the alleged verification secret may be compared to the verification secret. The method may then comprise sending to the receiver via the receiver interface either a positive response if there is a match between the alleged verification secret and the verification secret or a negative response if either: (1) there is no match between the one or more second identifiers and the one or more first identifiers; or (2) there is no match between the alleged verification secret and the verification secret. This method may be implemented by a verification system.

Figure 1A:
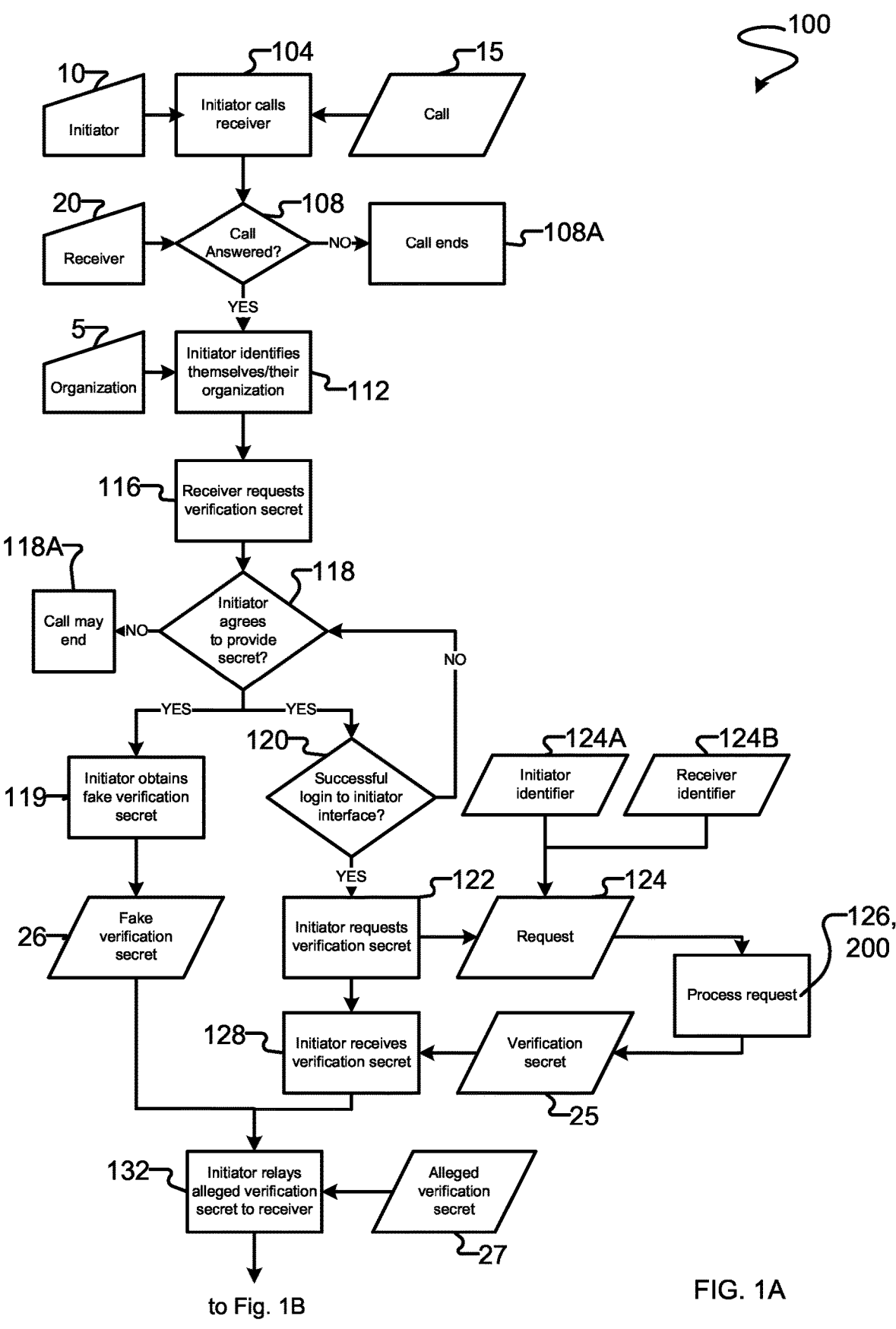
FIGS. 1A and 1B (collectively, FIG. 1) together provide a schematic depiction of a method for verifying the alleged affiliation of an initiator with an organization according to an exemplary embodiment of the invention.
Figure 1B:
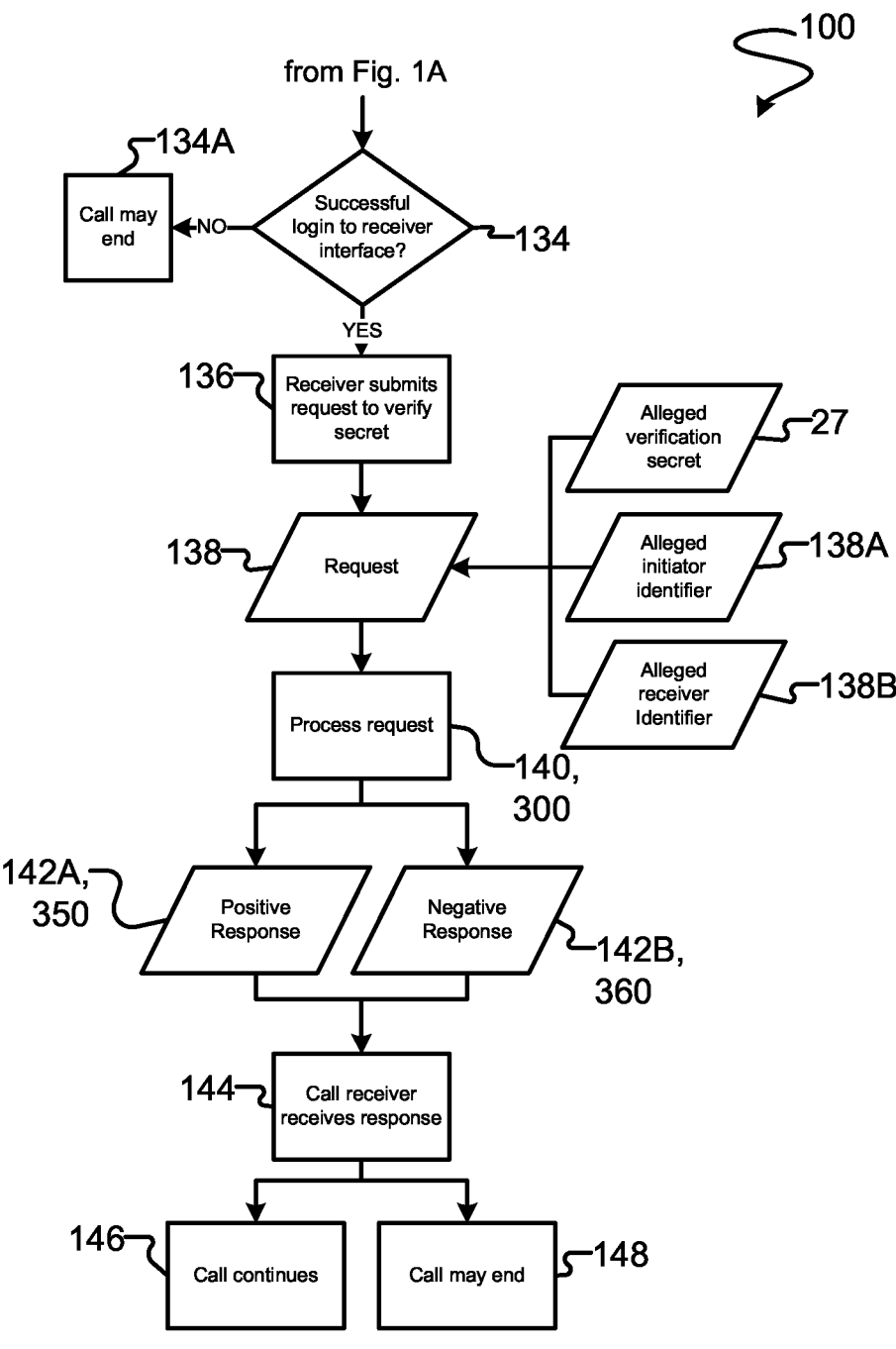
Figure 4:
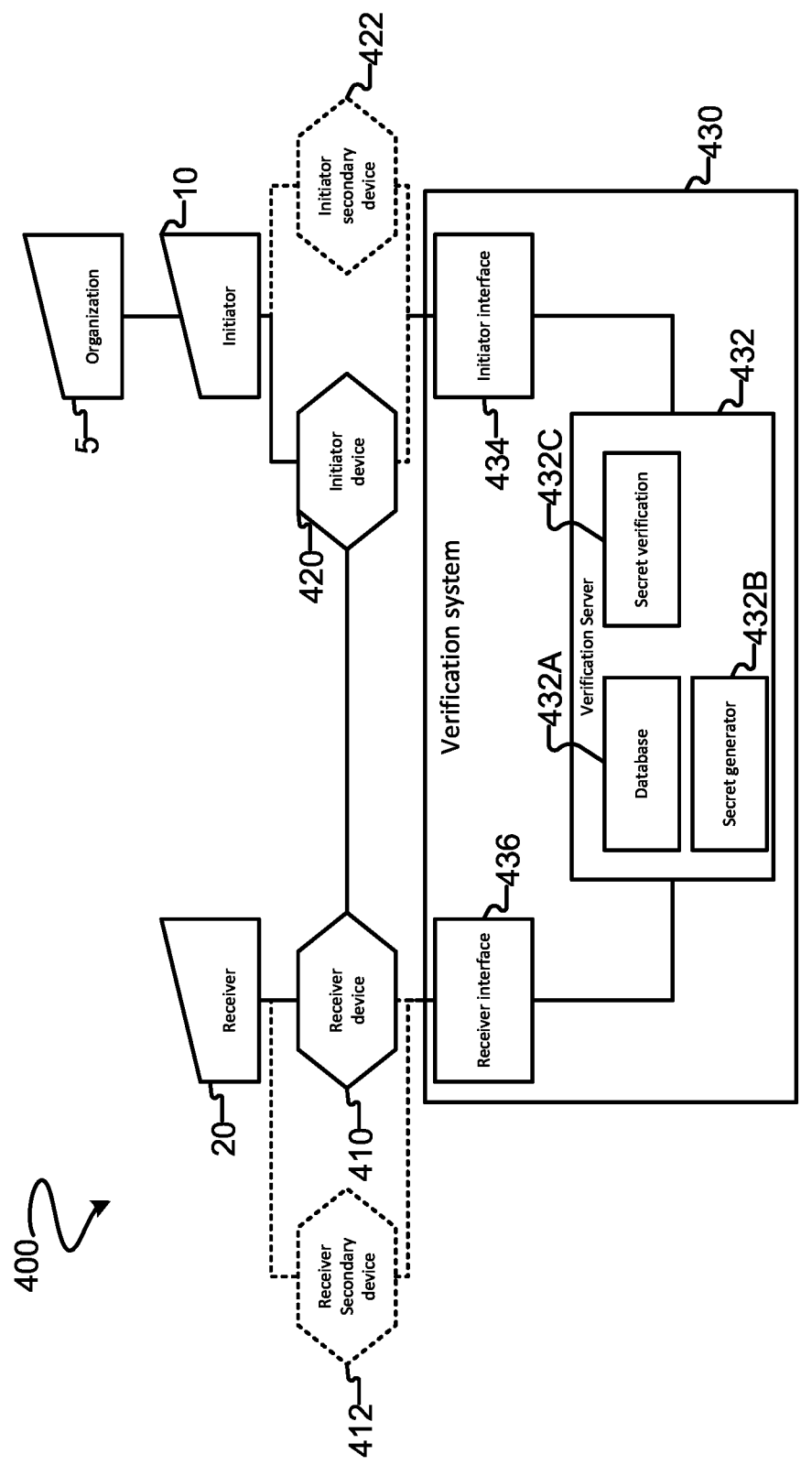
FIG. 4 is a schematic depiction of a system for verifying the alleged affiliation of an initiator according to an exemplary embodiment of the invention.

FIGS. 1A and 1B together provide a broad schematic depiction of an exemplary method 100 for facilitating verification, by a receiver 20, of an alleged affiliation of an initiator 10 with an organization 5 according to an embodiment of the invention. FIG. 4 is a broad schematic depiction of an exemplary system 400 for implementing method 100 according to one aspect of the invention.

For convenience and ease of explanation, method 100 as described and depicted herein may include various blocks used in part to provide context and it should be understood that method 100 may be practiced with or without such blocks.

Method 100 may start, for example, at block 104. At block 104, an initiator 10 initiates a call 15 to a receiver 20.

In some embodiments, initiator 10 is affiliated with organization 5. For example, initiator 10 may comprise an employee or representative of organization 5 or initiator 10 may comprise an employee of a call-center or the like employed by or otherwise affiliated with organization 5. In some embodiments, initiator 10 is a bad actor who is not validly affiliated with organization 5 and method 100 may be employed to identify them as such.

Organization 5 may comprise any suitable type of organization such as, for example, a for-profit corporation, a not-for-profit corporation (e.g., a charity), a government agency, a financial institution (e.g., a bank), etc.

Receiver 20 may comprise an individual or another organization. Receiver 20 may wish to confirm or verify an alleged affiliation of initiator 10 with organization 5.

Call 15 may comprise a voice call, a video call, a text chat or the like. Call 15 may employ plain old telephone service (POTS), public switched telephone network (PSTN), voice over IP (VOIP), video conferencing, video calling (e.g., by Skype™, Teams™, FaceTime™, Zoom™, or the like), SMS messaging, a chatbot, a text chat via a mobile software application (e.g., WhatsApp™ or the like), or other suitable communication protocols.

Initiator 10 may initiate call 15 on an initiator device 420 (FIG. 4). Initiator device 420 may comprise any suitable device for initiating call 15 such as, for example, a telephone, a landline telephone, a mobile telephone, a cellular telephone, a cellular smartphone, a personal computer, a laptop, a handheld wireless communication device, a tablet computer, a wearable device (e.g., a smartwatch) a video-conferencing system, a power dialer or any other device with communication capabilities.

Receiver 20 may receive call 15 on a receiver device 410 (FIG. 4). Receiver device 410 may likewise comprise any suitable device for receiving call 15 such as, for example, a telephone, a landline telephone, a mobile telephone, a cellular telephone, a cellular smartphone, a personal computer, a laptop, a handheld wireless communication device, a tablet computer, a wearable device (e.g., a smartwatch), a video-conferencing system, a power dialer or any other device with communication capabilities. Receiver device 410 may comprise a device owned by receiver 20 but this is not mandatory. For example, receiver device 410 may comprise a public device, a shared device or a device belonging to an employer of receiver 20.

Call 15 may have any purpose. For example, call 15 may be a purported sales call, a call to update or retrieve customer information, a call to report a change of a customer account, etc. In general, call 15 may be a legitimate call (e.g. from an initiator 10 affiliated with organization 5) or call may be illegitimate (e.g. from a bad actor). Call 15 may have been requested by receiver 20 or call 15 may be an unsolicited call.

Method 100 may continue at block 108. At block 108, receiver 20 chooses whether or not to answer call 15. Receiver 20 may answer call 15 in any suitable way. If receiver 20 does not answer call 15, then call 15 (and method 100) ends at block 108A.

If call 15 is answered at block 108, method 100 may continue at block 112. At block 112, initiator 10 may identify themselves and/or their alleged affiliation with organization 5. For example, initiator 10 may provide one or more of their name, the name of organization 5 with which they are allegedly affiliated, an employee identification number, etc. Where initiator 10 is a bad actor, initiator 10 may misrepresent their identity and/or affiliation with organization 5.

Method 100 may continue at block 116. At block 116, receiver 20 requests a verification secret 25 from initiator 10. This request may be a verbal request, but this is not mandatory. For example, receiver 20 may request verification secret 25 from initiator 10 by pressing one or more keys on a keypad of their telephone (e.g., where call 15 is a telephone call), by typing a request into a chat box (e.g., where call 15 is a text chat or a video call with text chat capabilities), etc. In some embodiments, receiver 20 requests verification secret 25 at block 116 in response to an offer by initiator 10 to provide verification secret 25, but this is not mandatory.

In response to the request at block 116, initiator 10 may, at block 118, choose to agree to provide a verification secret 25 to receiver 20 or initiator 10 may choose to reject the request for a verification secret 25. Where initiator 10 is a bad actor and knows that they cannot obtain a valid verification secret 25, they may refuse to provide a verification secret 25 to receiver 20 at block 118 and receiver 20 may choose to end the call at block 118A. Alternatively, despite a "no" outcome at block 118 (i.e. initiator 10 does not provide verification secret), receiver 20 may choose to continue call 15 with caution (e.g., without providing any sensitive information to initiator 10).

Alternatively, where initiator 10 is a bad actor and knows that they cannot obtain a valid verification secret 25, initiator 10 may nonetheless agree to provide a verification secret 25 at block 118 with the intention of providing a fake verification secret 26. In such a case, method 100 continues from block 118 to block 119 where initiator 10 obtains or creates a fake verification secret 26.

On the other hand, where initiator 10 is validly affiliated with organization 5, initiator 10 may agree to provide a verification secret 25 at block 118 in which case method 100 continues to block 120.

At block 120, initiator 10 may attempt to login to verification system 430 via initiator interface 434 of verification system 430 (see FIG. 4).

Figure 5:
FIG. 5 is a depiction of an initiator interface of a system for verifying the alleged affiliation of an initiator with an organization according to an exemplary embodiment of the invention.
Figure 6:
FIG. 6 is an exemplary depiction of an initiator interface of a system for verifying the alleged affiliation of an initiator with an organization according to an exemplary embodiment of the invention.
Figure 6:
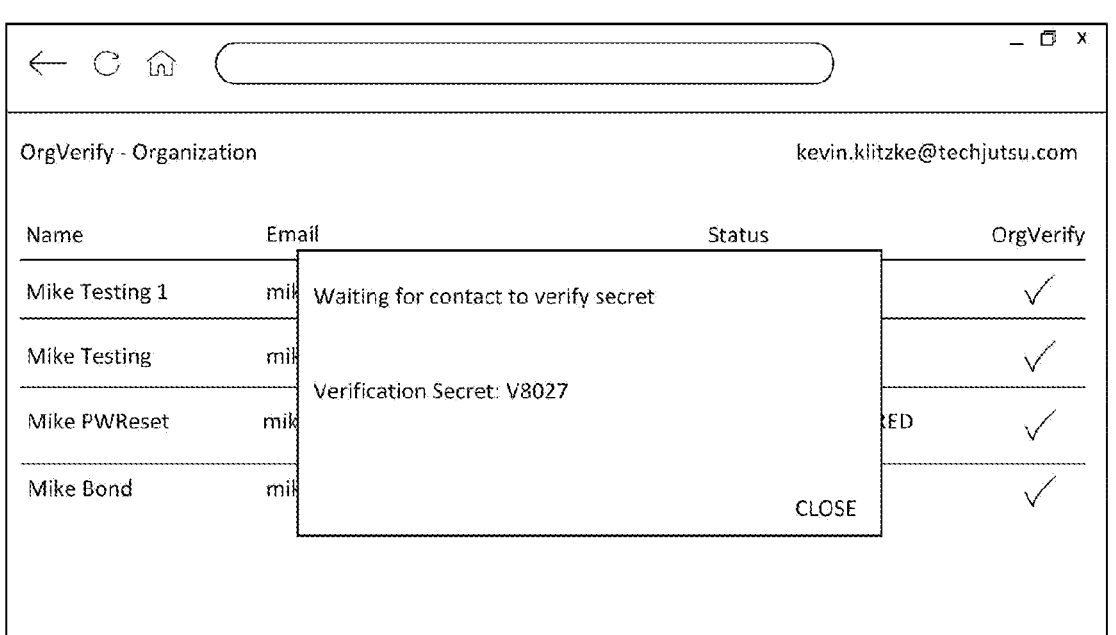
Figure 7:
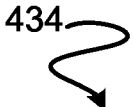
FIG. 7 is an exemplary depiction of an initiator interface of a system for verifying the alleged affiliation of an initiator with an organization according to an exemplary embodiment of the invention.
Figure 7:
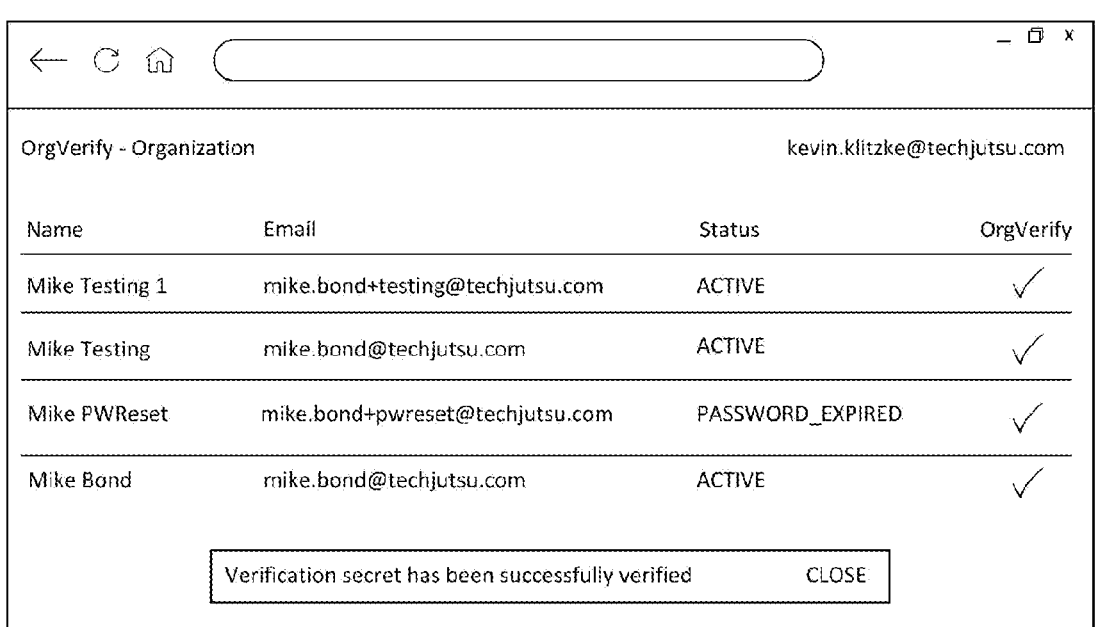

Initiator interface 434 may comprise a downloadable software application (e.g., a desktop application or a mobile application) of verification system 430, a website accessed by a suitable web browser of initiator 10, a non-downloadable web-based application of verification system 430, etc. In some embodiments, initiator interface 434 comprises a web interface served over Hyper Text Transfer Protocol Secure (HTTPS) (port 443) network protocol that is used to request, navigate, and deliver web content (such as web pages, web applications, APIs, etc.). Initiator interface 434 may be integrated (e.g., by a suitable plugin or the like) into software of organization 5 or a third party software employed by organization 5 (e.g., customer relationship management software such as that of Salesforce™, HubSpot™ and/or the like). FIGS. 5 to 7 depict exemplary screenshots of an initiator interface 434 according to an exemplary embodiment of the invention.

Initiator interface 434 may be in communication with a server 432 of verification system 430 by way of a suitable network such as, for example, a packet-switched network in the form of a LAN, a WAN, a cellular network, a satellite network, the public Internet, a Virtual Private Network (VPN) or the like.

Figure 2:
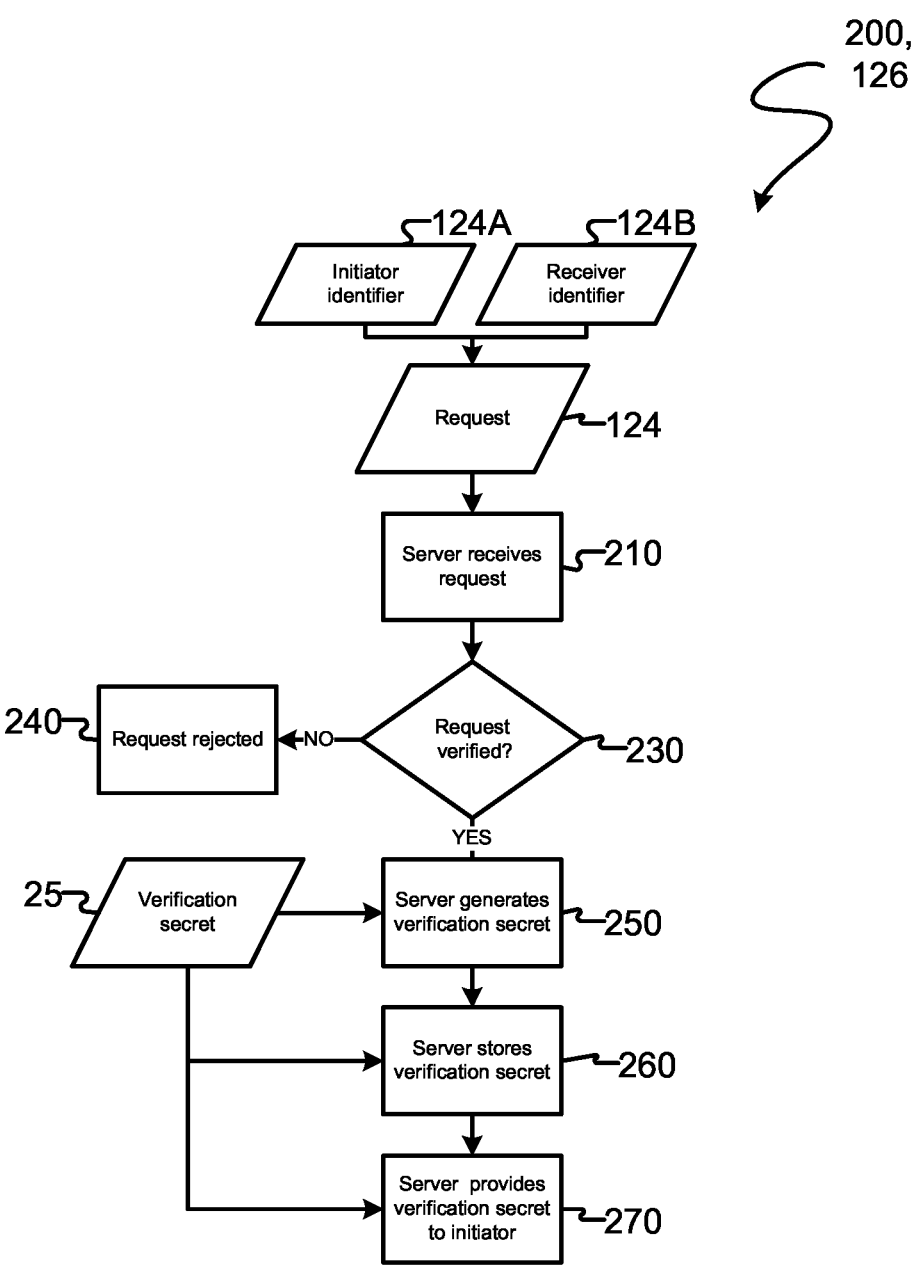
FIG. 2 is a schematic depiction of a sub-method for verifying the alleged affiliation of an initiator with an organization according to an exemplary embodiment of the invention.

Server 432 may comprise one or more processors for carrying out various blocks described herein (e.g., blocks 126 and 140 of method 100) and/or various sub-methods described herein (e.g., sub-methods 200 and 300 described in more detail below in connection with FIGS. 2 and 3). Server 432 may comprise a communication module for receiving and sending information (e.g., to and from initiator interface 434 and receiver interface 436) as described further herein.

Initiator interface 434 may be accessed by initiator 10 on initiator device 420 or on a secondary initiator device 422. For example, where initiator device 420 comprises a land-line telephone, initiator 10 may access initiator interface 434 from a separate secondary initiator device 412. Secondary initiator device 422 may comprise any suitable device with processing and communications capabilities such as, for example, a cellular smartphone, a personal computer, a laptop, a handheld wireless communication device, a tablet computer, a power dialer or a wearable device (e.g., a smartwatch).

Returning to FIG. 1, at block 120, initiator 10 may automatically be prompted to login to verification system 430 when initiator 10 accesses initiator interface 434. In some embodiments, initiator 10 may be prompted to login by providing login credentials (e.g., a username and password). Additionally or alternatively, two-factor authentication may be employed to authenticate initiator 10 at block 120. Login may follow a standard protocol such as, for example, OAuth2.0 protocol. This authentication may prevent bad actors from accessing initiator interface 434 and obtaining a verification secret 25. While block 120 is described and depicted as occurring after block 118, this is not mandatory. In some embodiments, block 120 occurs before block 118 (and even optionally before block 104).

If login is not successful at block 120 (e.g., since initiator 10 is a bad actor) method 100 may return to block 118. If login is successful at block 120, method 100 continues to block 122.

At block 122, initiator 10 submits a request 124 for a verification secret 25 to server 432 of verification system 430 via initiator interface 434. Request 124 may be a request for a verification secret 25 specific to initiator 10 and organization 5 such that a resultant verification secret 25 may only be used to verify an affiliation of initiator 10 with organization 5. Request 124 may be a request for a verification secret 25 specific to receiver 20 such that a resultant verification secret 25 may only be used by receiver 20 (thereby also allowing for confirmation of the identity of receiver 20). Request 124 may therefore include an initiator identifier 124A (representative of initiator 10 and/or organization 5) and/or a receiver identifier 124B. Such identifiers may comprise one or more of a name, phone number, email address, account number, user ID, date of birth, business registration number, etc.

In some embodiments, after initiator 10 logs in to initiator interface 434 of verification system 430 at block 120, initiator may select an option to request a verification secret 25 at block 122. Initiator 10 may then be prompted to input a receiver identifier 124B. For example, FIG. 5 depicts an exemplary initiator interface 434 where initiator 10 can select a receiver identifier 124B from amongst a number (e.g. four) of options.

As initiator 10 has already identified themselves and/or their organization 5 by logging in to interface 434 of verification system 430 at block 120, initiator 10 may not be prompted to input initiator identifier 124A when submitting request 124. Instead, initiator identifier 124A may be automatically included based on the login credentials.

At block 126, request 124 may be processed by verification system 430. If request 124 is accepted, a verification secret 25 may be output to initiator 10 via initiator interface 434. If the request is rejected, method 100 may return to block 122. In some embodiments, request 124 is processed at block 126 according to sub-method 200, as depicted in FIG. 2. That is, sub-method 200 depicted in FIG. 2 represents a particular embodiment of a method for performing block 126. Sub-method 200 receives, as input, request 124. Sub-method 200 may be performed by verification system 430.

At block 210 of sub-method 200, a server 432 of verification system 430 receives request 124. Request 124 may be communicated from initiator interface 434 to server 432 by any suitable means. In some embodiments, this communication (and like communications discussed herein) may be enabled, for example, by an interface between two computer programs in the form of an application programming interface (commonly referred to as an "API") such as, for example, a representational state transfer (REST) API.

At block 230, initiator identifier 124A, and/or receiver identifier 124B contained in request 124 may optionally be verified against a database 432A hosted by or otherwise accessible to server 432. If initiator identifier 124A, and/or receiver identifier 124B contained in request 124 match entries in database 432A, sub-method 200 may proceed to block 250. If initiator identifier 124A, and/or receiver identifier 124B contained in request 124 do not match entries in database 432A, request 124 may be rejected at block 240 thereby returning initiator 10 to block 122 (FIG. 1).

At block 250, a secret generation module 432B hosted on server 432 may generate a verification secret 25. Verification secret 25 may comprise, for example, a series of alphanumeric characters and symbols, one or more images (e.g., photos, drawings, animations, etc.), a word, a name of an object, a description of one or more images, a sound, a scent, etc. Verification secret 25 may be generated in any suitable manner by secret generation module 432B. For example, secret generation module 432B may comprise a random alphanumeric generator, a random word generator, a random image generator, etc.

At block 260, the generated verification secret 25 may be stored in database 432A (or another database hosted by or otherwise accessible to server 432) in association with initiator identifier 124A, and/or receiver identifier 124B of request 124. In this way, verification secret 25 may be made to be specific to initiator identifier 124A, and/or receiver identifier 124B contained in request 124. Where verification secret 25 is specific to initiator identifier 124A contained in request 124, verification secret 25 may not be used to verify an affiliation of a different initiator 10 or a different organization 5. Where verification secret 25 is specific to receiver identifier 124B contained in request 124, receiver 20 may be prompted to identify themselves prior to using verification secret 25 (e.g., at block 134 of FIG. 1) such that only receiver 20 may use verification secret 25. In other embodiments, to facilitate use of verification secret 25, receiver 20 may not be prompted to identify themselves to use verification secret 25 (e.g., block 134 may be skipped).

In some embodiments, verification secret 25 expires after a set amount of time. In some embodiments, verification secret 25 is deleted from database 432A at the end of the set amount of time. In other embodiments, verification secret 25 continues to be stored in database 432A to keep a record of its creation but it is no longer available for verification (e.g. at block 320 of sub-method 300 (FIG. 3) described in more detail below) after a set amount of time.

Sub-method 200 may continue at block 270. At block 270, server 432 may send verification secret 25 to initiator 10 thereby ending sub-method 200. In some embodiments, verification secret 25 is provided (e.g., displayed) to initiator 10 via initiator interface 434 as part of block 270. For example, FIG. 6 depicts an exemplary initiator interface 434 with a prompt displaying an alphanumeric verification secret 25, "V8027". While block 270 is described and depicted as occurring after block 260, it should be understood that the order of blocks 260 and 270 could be reversed.

Returning to method 100 (FIG. 1), after block 126, method 100 may continue at block 128 where initiator 10 receives verification secret 25 (e.g., as output from block 126 (e.g. sub-method 200)).

Method 100 may continue from block 128 (or block 119) to block 132. At block 132, initiator 10 may communicate an alleged verification secret 27 to receiver 20. Alleged verification secret 27 may comprise fake verification secret 26 (e.g., where method 100 proceeds from block 119 to block 132) or legitimate verification secret 25 (e.g., where method 100 proceeds from block 128 to block 132).

In some embodiments, such as where alleged verification secret 27 is an alphanumeric secret, a sound, a word or a name of an object, alleged verification secret 27 may be communicated to receiver 20 verbally (e.g., via call 15), but this is not mandatory. Instead, alleged verification secret 27 can be communicated to receiver 20 visually (e.g., where call 15 is a video call), by text (e.g., via a separate SMS or MMS message sent to receiver 20 or within a chat function of call 15), by email, via a mobile software application or the like.

Once receiver 20 has received alleged verification secret 27 at block 132, method 100 may proceed to block 134 (see FIG. 1B). Block 134 is optional. At block 134, receiver 20 may attempt to login to verification system 430 via receiver interface 436 of verification system 430 (FIG. 4).

Receiver interface 436 may comprise a downloadable software application (e.g., a desktop application or a mobile application) of verification system 430, a website accessed by a suitable web browser, a non-downloadable web-based application of verification system 430, etc. In some embodiments, receiver interface 436 comprises a web interface served over Hyper Text Transfer Protocol Secure (HTTPS) (port 443) network protocol that is used to request, navigate, and deliver web content (such as web pages, web applications, APIs, etc.). Receiver interface 436 may be integrated (e.g., by a suitable plugin or the like) into software of organization 5 (e.g., such as a consumer-facing mobile app of organization 5). FIGS. 8 to 11 depict exemplary screenshots of a receiver interface 436 according to an exemplary embodiment of the invention.

Receiver interface 436 may be accessed by receiver 20 on receiver device 410 or a secondary receiver device 412. For example, where receiver device 410 comprises a landline telephone, receiver 20 may access receiver interface 436 from a separate secondary receiver device 412. Secondary receiver device 412 may comprise any suitable device with processing and communications capabilities such as, for example, a cellular smartphone, a personal computer, a laptop, a handheld wireless communication device, a tablet computer or a wearable device (e.g., a smartwatch).

Where receiver interface 436 comprises a downloadable software application, it may be a precondition of method 100 that receiver 20 has already downloaded the receiver interface 436 software application but this is not mandatory. Instead, for example, initiator 10 may assist receiver 20 during call 15 to download, install and access the receiver interface 436 software on receiver device 410 or receiver secondary device 412 (see FIG. 4).

Receiver interface 436 may be in communication with server 432 of verification system 430 by way of a suitable network such as, for example, a packet-switched network in the form of a LAN, a WAN, a cellular network, a satellite network, the public Internet, a VPN or the like.

At block 134, receiver 20 may automatically be prompted to login to verification system 430 when receiver 20 accesses receiver interface 436. In some embodiments, receiver 20 may be prompted to login by providing login credentials (e.g., a username and password) at block 134. Additionally or alternatively, two-factor authentication may be employed at block 134 to authenticate receiver 20. Authentication may follow a standard protocol such as, for example, OAuth2.0 protocol. This authentication may prevent bad actors from accessing receiver interface 436. While block 134 is described and depicted as occurring after block 132, this is not mandatory. In some embodiments, block 134 does not occur. In some embodiments, block 134 occurs before block 132 (and even possibly before block 104).

If login is not successful at block 134, initiator 10 may end call 15 (e.g., on suspicion that receiver 20 is not the party that initiator 10 is trying to reach). Alternatively, if login is not successful at block 134 because receiver 20 does not yet have an account with verification system 430, initiator 10 may assist receiver 20 in creating such an account. If login is successful at block 134, method 100 continues to block 136.

At block 136, receiver 20 may attempt to validate alleged verification secret 27 with verification system 430 by submitting a request 138 to verification system 430 via receiver interface 436.

Figure 9:
FIG. 9 is an exemplary depiction of a receiver interface of a system for verifying the alleged affiliation of an initiator with an organization according to an exemplary embodiment of the invention.

When receiver 20 accesses receiver interface 436 to create request 138, they may be prompted to input alleged verification secret 27. Inputting alleged verification secret 27 may comprise, for example, typing in alleged verification secret 27 via an appropriate peripheral (e.g., a physical or virtual keyboard) where alleged verification secret 27 comprises an alphanumeric secret, choosing an image from a selection of images where alleged verification secret 27 comprises an image or a word represented by one of the images in the selection, choosing a sound from a selection of sounds where alleged verification secret 27 comprises a sound, etc. For example, FIG. 9 depicts an exemplary receiver interface 436 where receiver 20 is being prompted to input alleged verification secret 27.

In some embodiments, receiver 20 may also be prompted to input one or more of alleged initiator identifier 138A and alleged receiver identifier 138B. Such identifiers may comprise one or more of an organization name, phone number, email address, account number, user ID, business registration number, etc.

Figure 8:
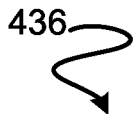
FIG. 8 is an exemplary depiction of a receiver interface of a system for verifying the alleged affiliation of an initiator with an organization according to an exemplary embodiment of the invention.
Figure 8:
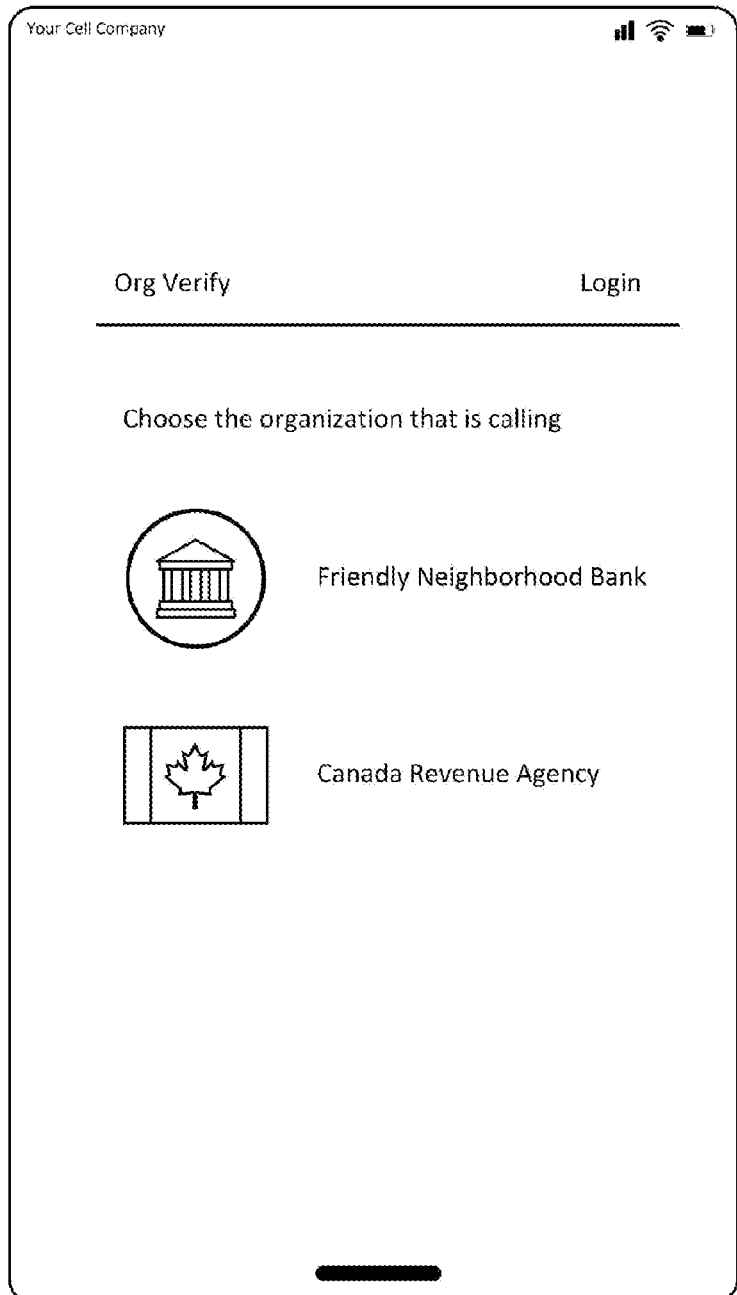

In some embodiments, receiver 20 is prompted to select an alleged initiator identifier 138A from a list of possible identifiers (e.g., a list of names of organizations) before, after or during inputting of alleged verification secret 27. For example, FIG. 8 depicts an exemplary receiver interface 436 where receiver 20 is being prompted to input an alleged initiator identifier 138A by choosing from a list of organizations (e.g., "Friendly Neighborhood Bank" or "Canada Revenue Agency"). In some embodiments, such as where receiver 20 is accessing receiver interface 136 via software of organization 5, alleged initiator identifier 138A may be automatically included in request 138.

In some embodiments, where receiver 20 has already identified themselves in accessing receiver interface 136 (e.g., by logging in and/or authenticating themselves at block 134), receiver 20 may not be prompted for alleged receiver identifier 138B and instead alleged receiver identifier 138B may be automatically included in request 138.

Once receiver 20 has completed request 138 by inputting alleged verification secret 27 and optionally one or more of alleged initiator identifier 138A, and alleged receiver identifier 138B, request 138 may be sent to server 432 of verification system 430 to be processed at block 140. As with communications between initiator interface 434 and server 432, request 138 (and other communications between receiver interface 436 and server 432) may be communicated to server 432 by API or the like.

Figure 3:
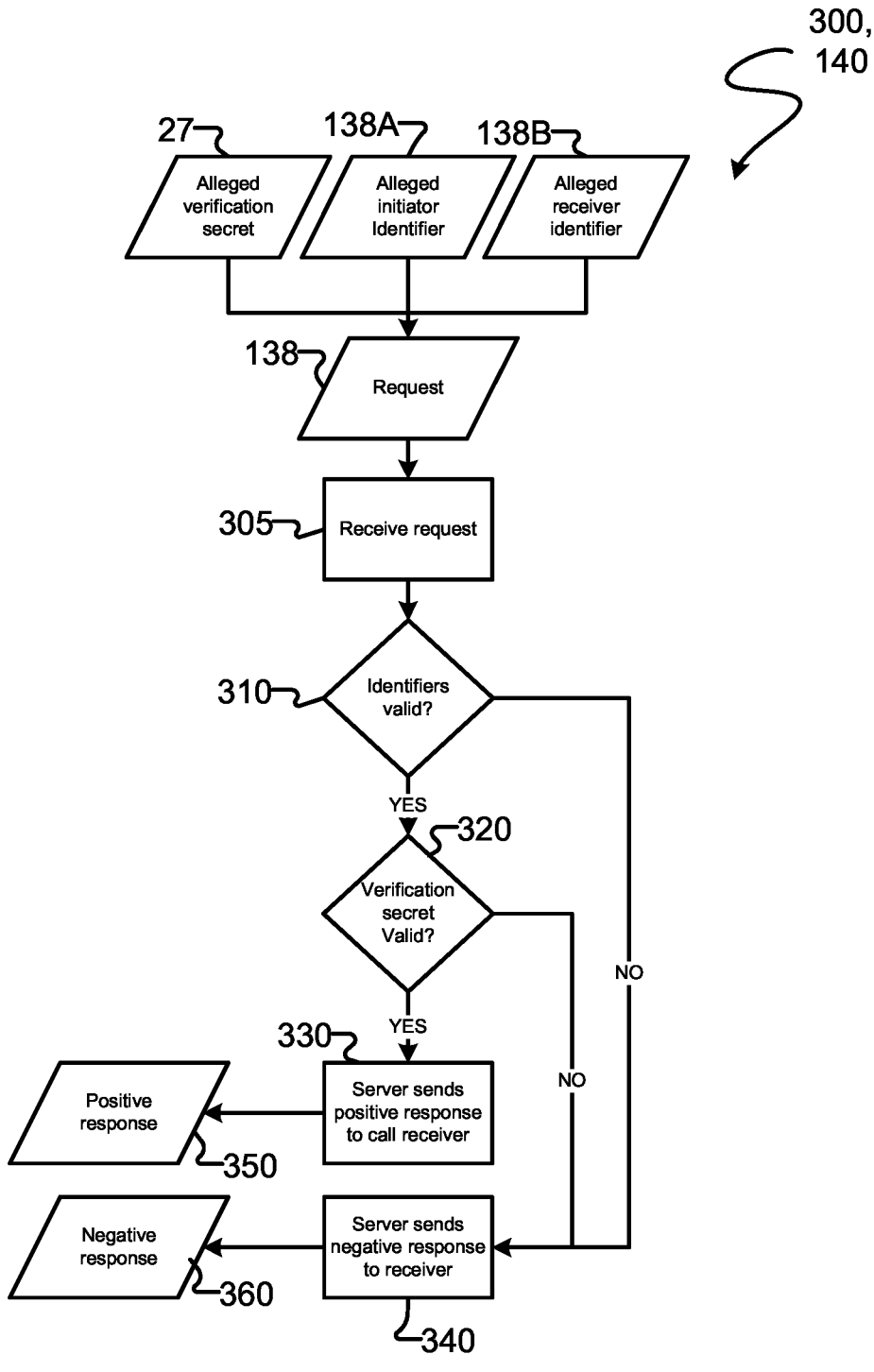
FIG. 3 is a schematic depiction of another sub-method for verifying the alleged affiliation of an initiator with an organization according to an exemplary embodiment of the invention.

In some embodiments, request 138 is processed at block 140 according to sub-method 300, as depicted in FIG. 3. That is, sub-method 300 represents one exemplary embodiment of a method for performing block 140. Sub-method 300 receives, as input, request 138. Sub-method 300 may be performed by verification system 430.

Sub-method 300 starts at block 305 when server 432 receives request 138 (e.g., as output from method 100). Then, at block 310, a secret verification module 432C of server 432 may determine if there is a verification secret 25 stored in database 432A in association with an initiator identifier 124A and/or receiver identifier 124B that matches the alleged initiator identifier 138A and/or alleged receiver identifier 138B (as the case may be) of request 138.

If secret verification module 432C determines that there is no verification secret 25 stored in database 432A in association with an initiator identifier 124A and/or a receiver identifier 124B that matches the alleged initiator identifier 138A and/or alleged receiver identifier 138B of request 138 (e.g., a "no" determination at block 310), then server 432 outputs a negative response 360 to receiver 20 via receiver interface 436 at block 340.

If there is a "yes" determination at block 310, then method 300 may continue to block 320 where secret verification module 432C compares alleged verification secret 27 of request 138 against the corresponding verification secret 25 stored in database 432A to see if there is a match.

If alleged verification secret 27 of request 138 matches the corresponding verification secret 25 stored in database 432A, then there is a "yes" determination at block 320 and server 432 outputs a positive response 350 to receiver 20 via receiver interface 436 at block 330. Server 432 may also delete or deactivate any verification secret 25 that is stored in database 432A in association with an initiator identifier 124A and/or a receiver identifier 124B that matches the alleged initiator identifier 138A and/or alleged receiver identifier 138B of request 138 to increase security of method 300 (e.g., to prevent bad actors from re-using verification secret 25).

At block 330, server 432 may also communicate to initiator interface 434 indicating that verification secret 25 has been successfully verified. Initiator interface 434 may then display a message, sound or the like to initiator 10 to alert initiator 10 that verification secret 25 has been successfully verified. FIG. 7 depicts an exemplary initiator interface 434 with a message indicating to initiator 10 that verification secret 25 has been successfully verified by receiver 20.

If secret verification module 432C determines at block 320 that alleged verification secret 27 of request 138 does not match the corresponding verification secret stored in database 432A in association with initiator identifier 124A and/or a receiver identifier 124B that match the alleged initiator identifier 138A and/or alleged receiver identifier 138B of request 138 (e.g. a "no" determination at block 320), then server 432 outputs a negative response 360 to receiver 20 via receiver interface 436 at block 340. Server 432 may also delete or deactivate any verification secret 25 that is stored in database 432A in association with an initiator identifier 124A and/or a receiver identifier 124B that matches the alleged initiator identifier 138A and/or alleged receiver identifier 138B of request 138 to increase security of method 300 (e.g., to prevent bad actors from repeatedly trying different fake verification secrets 26.)

Where there is a "no" determination at either of block 310 or block 320, verification system 430 may optionally alert appropriate authorities and/or the organization 5 associated with alleged initiator identifier 138A of request 38 of the attempt to defraud receiver 20.

Returning to method 100 (FIG. 1), method 100 continues from block 140 to block 144. At block 144 receiver 20 receives a positive response 142A or a negative response 142B from server 432. Response 142A may comprise positive response 350 output from sub-method 300. Negative response 142B may comprise negative response 360 output from sub-method 300. Positive response 142A and/or negative response 142B may be received by receiver 20 via receiver interface 436.

Figure 10:
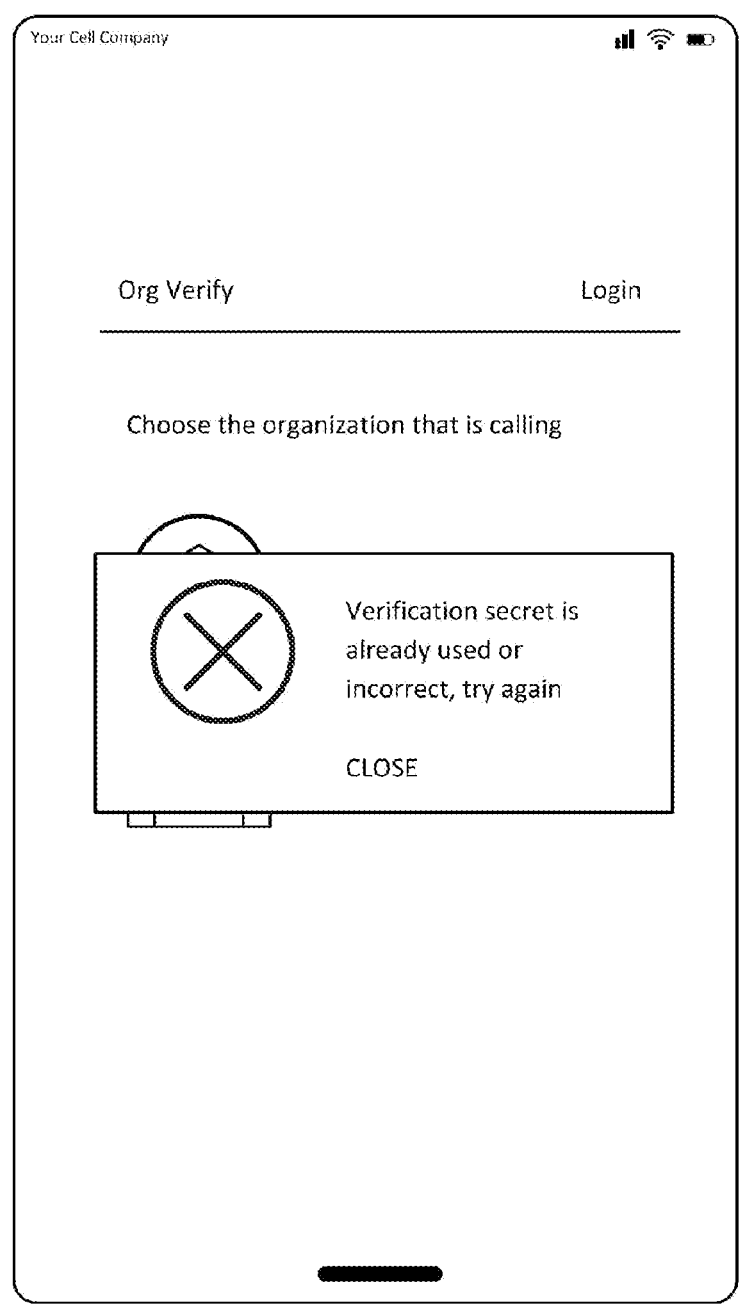
FIG. 10 is an exemplary depiction of a receiver interface of a system for verifying the alleged affiliation of an initiator with an organization according to an exemplary embodiment of the invention.

Positive response 142A may include a message to tell receiver 20 that the affiliation of initiator 10 with organization 5 is verified such as is shown in FIG. 10. Positive response 142A may include a sound, image and/or color (e.g., the color green) representative of the positive nature of positive response 142A. Where positive response 142A is received at block 144, receiver 20 may choose to continue with call 15 at block 146 with knowledge that the affiliation of initiator 10 with organization 5 has been verified, thereby ending method 100. This is not mandatory and despite positive response 142A being positive, receiver 20 could nonetheless choose to end call 15 such that method proceeds to block 148 thereby ending method 100.

Figure 11:
FIG. 11 is an exemplary depiction of a receiver interface of a system for verifying the alleged affiliation of an initiator with an organization according to an exemplary embodiment of the invention.

Negative response 142B may include a message to tell receiver 20 that initiator 10 is not verified as being affiliated with organization 5 such as is shown in FIG. 11. Negative response 142B may include a sound, image and/or color (e.g., the color red) representative of the negative nature of negative response 142B. Where negative response 142B is received at block 144, receiver 20 may choose from various options. For example, receiver 20 may choose to end call 15 at block 148 (e.g., due to an increased likelihood that initiator 10 is a bad actor) thereby ending method 100, receiver 20 may choose to ask initiator 10 to provide another verification secret 25 thereby returning method 100 to block 116, or receiver 20 may choose to proceed with call 15 with caution (e.g., without providing any sensitive information to initiator 10) at block 146. If receiver 20 chooses to end call 15, receiver 20 may, if they choose, then reach out to the organization 5 identified by initiator 10 during call 15 in order to confirm that there has been no security breach of the account or information of receiver 20.

A record of each instance of method 100 (e.g., records of request 124, alleged verification secret 27, verification secret 25 and/or request 138) may be stored in database 432A (or another suitable database) of server 432 (or another suitable server) in accordance with security and audit best practices.

Embodiments of method 100 (including sub-methods 200 and 300) and system 400 as disclosed herein may address some of the time-consuming and interoperability issues of existing initiator affiliation verification solutions by:

providing a protection mechanism to vulnerable persons (e.g., receivers 20) currently falling prey to organization impersonation fraud through caller ID spoofing, and agent code phishing;

facilitating compliance with the Health Insurance Portability and Accountability Act (HIPAA) which requires covered entities to implement reasonable and appropriate administrative, technical, and physical safeguards to protect the confidentiality, integrity, and availability of electronic protected health information (ePHI);

protecting organizations (e.g., organizations 5) from the investigation and remediation costs incurred where organization impersonation fraud has led receivers 20 to expose their personal information that bad actors have used to compromise the receiver's accounts;

facilitating accessibility of initiator-affiliation-verification to receivers 20 as method 100 can be provided to receivers 20 without direct costs to the receivers 20;

facilitating accessibility of initiator-affiliation-verification to receivers 20 as method 100 may be employed for receivers 20 who are visually impaired or memory impaired; and/or facilitating initiator-affiliation-verification for receivers 20 by reducing a need for receivers 20 to independently verify information of initiators 10 or contact organizations 5 on their own.

EXAMPLE EMBODIMENT 1

In a first example embodiment, an initiator 10 employed by a government agency organization 5 initiates a call 15 with a citizen receiver 20 from a personal computer (initiator device 420) at block 104 to request personal information of receiver 20 for tax purposes. At block 108, receiver 20 answers call 15 on their smartphone (receiver device 410). Initiator 10 then introduces themselves as representing government agency organization 5 and outlines the purpose of call 15 (e.g., to request personal information of receiver 20 for tax purposes) at block 112. At block 116, receiver 20 requests for initiator 10 to verify themselves by providing a verification secret 25.

Initiator 10 then logs into initiator interface 434 at block 120 via a webpage on their personal computer (initiator device 420) by inputting their user-name and password. Initiator 10 is then prompted to select a phone number of receiver 20 from a list of options to initiate request 124 at block 122. Once the phone number of receiver 20 is selected, request 124 is sent to server 432 of verification system 430. Request 124 comprises a name of organization 5 (e.g., an initiator identifier 124A obtained from the initiator interface 434 login details of initiator 10) and a phone number of receiver 20 (e.g., a receiver identifier 124B as selected by initiator 10).

At block 210 of sub-method 200, request 124 is received by server 432. At block 230, request 124 is verified and at block 250 server 432 generates an alphanumeric verification secret 25. At block 260, verification secret 25 and request 124 are stored in database 432A. The alphanumeric verification secret 25 is then sent to initiator interface 434 at block 270.

At block 132 of method 100, initiator 10 reads alphanumeric verification secret 25 to receiver 20 via call 15. As initiator 10 reads alphanumeric verification secret 25 to receiver 20 via call 15, receiver 20 inputs alphanumeric alleged verification secret 27 into receiver interface 436 at block 136. In this exemplary embodiment, receiver 20 accesses receiver interface 436 through a mobile application of verification system 430 which receiver had previously downloaded onto their smartphone receiver device 410. As receiver 20 had logged into the mobile application of verification system 430 when they downloaded it (e.g., block 134 occurred prior to block 104), they are not prompted to login again.

Before (or after) inputting alphanumeric alleged verification secret 27 into receiver interface 436, receiver 20 may identify organization 5 by selecting a name of organization 5 from a list of names of organizations displayed on receiver interface 436 within the mobile application of verification system 430. Once this information is inputted into receiver interface 436, a request 138 is sent from receiver interface 436 to server 432. Request 138 comprises a name of organization 5 (e.g., alleged initiator identifier 138A as input by receiver 20), a phone number of receiver 20 (e.g., an alleged receiver identifier 138B as obtained when receiver 20 logged in to the mobile application of verification system 430 on receiver device 410) and alleged verification secret 27 as input by receiver 20.

At blocks 310 and 320 of sub-method 300, alleged initiator identifier 138A, alleged receiver identifier 138B and alleged verification secret 27 of request 138 are compared against initiator identifier 124A, receiver identifier 124B and verification secret 25 stored in database 432A by secret verification module 432C. In this case, as initiator 10 is a legitimate actor and alleged verification secret 27 is legitimate, there is a match and a positive response 350 is sent to receiver interface 436 at block 330. At block 144 of method 100, receiver 20 is prompted with a message (response 142) that the alleged verification secret 27 has been verified and receiver 20 continues call 15 at block 146 with the knowledge that they are actually speaking to a representative of government agency organization 5.

EXAMPLE EMBODIMENT 2

In a second example embodiment, a bad actor initiator 10 pretending to be employed by bank organization 5 initiates a call 15 with a receiver 20 from a personal computer (initiator device 420) at block 104 to request personal information of receiver 20 for fraudulent purposes. At block 108, receiver 20 answers call 15 on their landline (receiver device 410). Bad actor initiator 10 then introduces themselves as allegedly representing bank organization 5 at block 112. At block 116, receiver 20 requests for initiator 10 to verify themselves by providing a verification secret 25.

As bad actor initiator 10 cannot access initiator interface 434 without appropriate credentials at block 120, bad actor initiator 10 is not able to obtain a proper verification secret 25. Instead, bad actor initiator 10 attempts to convince receiver 20 that a verification secret 25 is not needed or that the bank organization 5 does not use the services of verification system 430 (e.g., a "no" determination at block 118).

Since bad actor initiator 10 does not provide the requested verification secret 25, receiver 20 decides that call 15 is likely to be fraudulent and ends call 15 at block 118A without providing any sensitive information to bad actor initiator 10.

EXAMPLE EMBODIMENT 3

In a third example embodiment, a bad actor initiator 10 pretending to be employed by a charitable organization 5 initiates a call 15 with a receiver 20 from a personal computer (initiator device 420) at block 104 to request personal information of receiver 20 for fraudulent purposes. At block 108, receiver 20 answers call 15 on their landline (receiver device 410). Bad actor initiator 10 then introduces themselves as allegedly representing charitable organization 5 at block 112. At block 116, receiver 20 requests for initiator 10 to verify themselves by providing a verification secret 25.

As bad actor initiator 10 cannot access initiator interface 434 without appropriate credentials (e.g. at block 120), bad actor initiator 10 is not able to obtain a proper verification secret 25. Instead, bad actor initiator 10 creates a fake alphanumeric verification secret 26 (at block 119) and provides the fake alphanumeric verification secret 26 to receiver 20 at block 132.

At block 136, receiver 20 inputs the fake alphanumeric verification secret 26 as alleged verification secret 27 into receiver interface 436. In this exemplary embodiment, receiver 20 accesses receiver interface 436 by using their laptop (secondary receiver device 412) to access and log into a web page of verification system 430 which displays receiver interface 436. Before (or after) inputting the fake alphanumeric alleged verification secret 27 into receiver interface 436, receiver 20 may identify charitable organization 5 by selecting a name of the charitable organization 5 from a list of names of organizations displayed on receiver interface 436 on the webpage of verification system 430. Once this information is inputted into receiver interface 436, a request 138 is sent from receiver interface 436 to server 432. Request 138 comprises a name of organization 5 (e.g., an alleged initiator identifier 138A as input by receiver 20), a phone number of receiver 20 (e.g., an alleged receiver identifier 138B as obtained when receiver 20 logged in to the web page of verification system 430 on receiver secondary device 412) and the fake alleged verification secret 27 as input by receiver 20.

At blocks 310 and 320 of sub-method 300, alleged initiator identifier 138A, alleged receiver identifier 138B and alleged verification secret 27 of request 138 are compared against initiator identifiers 124A, receiver identifiers 124B and verification secrets 25 stored in database 432A by secret verification module 432C. In this case, as initiator 10 is a bad actor, there is no match at block 310 and a negative response 360 is sent to receiver interface 436 at block 340. At block 144, receiver 20 is prompted with a message (e.g., response 142) that the alleged verification secret 27 is not verified and receiver 20 decides to end call 15 at block 148 thereby avoiding providing any sensitive information to bad actor initiator 10.

Interpretation of Terms

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes, steps or blocks are presented in a given order, alternative examples may perform routines having steps, or employ systems having blocks or steps, in a different order, and some processes or steps or blocks may be deleted, moved, added, subdivided, combined, and/or modified to provide alternative or sub-combinations. Each of these processes or steps or blocks may be implemented in a variety of different ways. Also, while processes or steps or blocks are at times shown as being performed in series, these processes or steps or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g., a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

In some embodiments, a non-transitory, computer readable medium is provided having one or more of an application program including computer instructions configured to cause at least one server and/or at least one processor to perform the methods (or one or more steps/blocks thereof) according to any of the disclosed methods.

Method embodiments (as well as one or more steps thereof) can be configured as computer readable program instructions (corresponding to the blocks/steps/methods) and can be downloaded to respective computing/processing devices from a computer readable storage medium or to an external computer or external storage device via a network, for example, the Internet, a local area network, a wide area network and/or a wireless network.

Aspects of the present disclosure are described sometimes with reference to a flow, a flow diagram, and/or block diagram of methods, apparatus (systems), and computer program products according to embodiments of the invention. It will be understood that each block or step of the flowchart illustrations and/or block diagrams, and combinations of steps or blocks in the flowchart illustrations and/or block diagrams, can be implemented by computer readable program instructions, operable, for example, on one or more components (e.g., server(s), processor(s)). These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram steps or blocks, in accordance with embodiments of the present disclosure.

Any flowchart and block diagrams of the present disclosure are examples of architecture, functionality, and operations, of at least some of the embodiments of systems, methods, and computer readable media supported herein. In this regard, each block or step in the flowchart or block diagrams may represent a module, segment, or portion of instructions, which includes one or more executable instructions for implementing the specified logical function(s). It will also be noted that each block or step of the block diagrams and/or flowchart illustration, and combinations of blocks or steps in the block diagrams and/or flowchart illustration, can be implemented by special purpose hardware-based systems that perform the specified functions or acts or carry out combinations of special purpose hardware and computer instructions.

It should be understood that at least some embodiments of the present disclosure can correspond to a cloud computing environment, but are not so limited, as embodiments of the present disclosure are capable of being implemented in conjunction with any other type of computing environment now known or later developed. With respect to a cloud computing environment, such is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method, performed by a verification server, of verifying, by a receiver during a call, an alleged affiliation of an initiator with an organization, the method comprising:

receiving, at the verification server, an initiator login request from the initiator via an initiator interface;

authenticating, by the verification server, the initiator login request;

receiving, at the verification server, an initiator verification request from the initiator via the initiator interface, the initiator verification request comprising one or more first identifiers representative of the alleged affiliation;

confirming, by the verification server, the alleged affiliation based at least in part on the one or more first identifiers;

in response to a positive confirmation via the confirming step, generating, by the verification server, a verification secret in response to the initiator verification request;

sending the verification secret from the verification server to the initiator via the initiator interface;

storing the verification secret in association with the one or more first identifiers in a database accessible to the verification server;

receiving, at the verification server, a receiver request to verify an alleged verification secret from the receiver via a receiver interface, the receiver request comprising one or more second identifiers representative of the alleged affiliation;

comparing, by the verification server, the one or more second identifiers to the one or more first identifiers stored in the database and determining, by the verification server, that there is a match between the one or more second identifiers and the one or more first identifiers;

comparing, by the verification server, the alleged verification secret to the verification secret and determining, by the verification server, that there is a match between the alleged verification secret and the verification secret; and in response to determining the match between the one or more second identifiers and the one or more first identifiers and determining the match between the alleged verification secret and the verification secret, sending from the verification server to the receiver via the receiver interface, a positive response that the alleged affiliation of the initiator with the organization is legitimate.

2. A system for verifying, by a receiver during a call, an alleged affiliation of an initiator with an organization, the system comprising one or more verification processors, the one or more verification processors configured to:

receive, at the one or more verification processors, an initiator login request from the initiator via an initiator interface;

authenticate the initiator login request;

receive, at the one or more verification processors, an initiator verification request from the initiator via the initiation interface, the initiator verification request comprising one or more first identifiers representative of an alleged affiliation;

confirm the alleged affiliation based at least in part on the one or more identifiers;

in response to a positive confirmation of the alleged affiliation, generate a verification secret in response to the initiator verification request;

send the verification secret from the one or more verification processors to the initiator via the initiator interface;

store the verification secret in association with the one or more first identifiers in a database accessible to the one or more verification processors;

receive, at the one or more verification processors, a receiver request to verify an alleged verification secret from the receiver via a receiver interface, the receiver request comprising one or more second identifiers representative of the alleged affiliation;

compare the one or more second identifiers to the one or more first identifiers stored in the database and, determine that there is a match between the one or more second identifiers and the one or more first identifiers;

compare the alleged verification secret to the verification secret and determine that there is a match between the alleged verification secret and the verification secret; and in response to determining the match between the one or more second identifiers and the one or more first identifiers and determining the match between the alleged verification secret and the verification secret, send from the one or more verification processors to the receiver via the receiver interface, a positive response that the alleged affiliation of the initiator with the organization is legitimate.

3. The method of claim 1 wherein the alleged verification secret comprises one or more images.

4. The method of claim 1 wherein:

the one or more first identifiers comprises a receiver identifier;

the one or more second identifiers comprises an alleged receiver identifier;

the receiver identifier comprises a name of the receiver; and the alleged receiver identifier comprises an alleged name of the receiver.

5. The method of claim 1 wherein the one or more first identifiers comprises an initiator identifier, and the one or more second identifiers comprises an alleged initiator identifier.

6. The method of claim 5 wherein the initiator identifier and the alleged initiator identifier comprise a name of the organization.

7. The method of claim 1 comprising storing, in the database, a transaction record comprising the initiator verification request, and the receiver request.

8. The method of claim 1 comprising:

receiving a time of receipt of the initiator verification request;

receiving a time of receipt of the receiver request; and calculating a delay time between the time of receipt of the initiator verification request and the time of receipt of the receiver request; and in response to determining that the delay time is less than a configurable threshold delay time, the match between the one or more second identifiers and the one or more first identifiers, and the match between the alleged verification secret and the verification secret, sending, from the verification server to the receiver via the receiver interface, the positive response.

9. The method of claim 1 comprising, in response to determining the match between the one or more second identifiers and the one or more first identifiers and determining the match between the alleged verification secret and the verification secret, sending from the verification server to the initiator via the initiator interface, a positive initiator response indicating that the alleged verification secret has been successfully verified by the receiver.

10. The method of claim 1 wherein sending the positive response from the verification server to the receiver via the receiver interface comprises causing the receiver interface to display a configurable visual indicator to the receiver.

11. The method of claim 10 wherein the configurable visual indicator comprises one or both of: text, and a color.

12. The method of claim 1 wherein the call comprises a voice call.

13. The method of claim 1 wherein the call comprises a text chat.

14. The method of claim 1 comprising, prior to the step of receiving the receiver request:

receiving, at the verification server, a receiver login request from the receiver via the receiver interface; and authenticating, by the verification server, the receiver login request.

15. The method of claim 1 wherein the call is initiated by the initiator on a first initiator device, and wherein the initiator verification request is received via the initiator interface via a second initiator device different from the first initiator device.

16. The system of claim 2 wherein the one or more verification processors are configured to store, in the database, a transaction record comprising the initiator verification request, and the receiver request.

17. The system of claim 2 wherein the one or more verification processors are configured to, in response to determining the match between the one or more second identifiers and the one or more first identifiers and determining the match between the alleged verification secret and the verification secret, send to the initiator via the initiator interface, a positive initiator response that the alleged verification secret has been successfully verified by the receiver.

18. The system of claim 2 wherein the one or more verification processors are configured to cause the receiver interface to display a configurable visual indicator to the receiver after sending the positive response to the receiver via the receiver interface.

19. The system of claim 2 wherein the one or more verification processors are configured to, prior to receiving the receiver request:

receive a receiver login request from the receiver via the
       receiver interface; and authenticate the receiver login request.

\*　\*　\*　\*　\*